Patented Aug. 31, 1926.

1,598,256

UNITED STATES PATENT OFFICE.

PAUL W. PRUTZMAN AND ARNOLD D. BENNISON, OF LOS ANGELES, CALIFORNIA, ASSIGNORS TO GENERAL PETROLEUM CORPORATION OF CALIFORNIA, OF LOS ANGELES, CALIFORNIA, A CORPORATION OF DELAWARE.

ADSORPTIVE AGENT FOR THE PURIFICATION OF LIQUIDS.

No Drawing. Original application filed August 17, 1925, Serial No. 50,870. Divided and this application filed March 23, 1926. Serial No. 96,868.

In the practice of the various arts relating to the refining of oils and of solutions of organic bodies, it is customary to make use of a class or group of bodies known generically as adsorbents, for the general purpose of removing impurities. The following subject matter relates thereto, and this present application is a division of application Serial Number 50870, filed August 17th, 1925, for improvements in agent for the purification of liquids by adsorption.

Under the general term "refining" we refer to the removal, from liquid bodies and bodies which may be liquefied, of undesirable dissolved or suspended bodies, the presence of which in the liquid reduces its value or usefulness for the purpose to which it is to be put. These undesirable bodies are classified under the general term "impurities", in that while they may themselves have a use and value when separated, they are, when present in minor quantity in the liquid to be refined, a contaminating and detrimental element.

Under the general term "oils", we include the following:—petroleum and its distillates or residues, such for instance as gasoline, kerosene, and lubricating oils: fatty oils, solid fats and fatty acids, such for instance as cottonseed oil, tallow and stearic acid: waxes, such as bees wax: resins such as colophony; and fossil resins, such as copal and kauri.

Under the general term "solutions of organic bodies" we refer to the solutions of solid or highly viscous bodies such as sugar, organic acids and salts, solid coal tar intermediates, etc. each in its proper solvent, such as water, alcohol, etc.

Benzol and other direct products from coal tar are also readily susceptible to purification by adsorption.

The term "adsorbent" is used technically as a group designation for a large number of solid substances which possess the common property of attracting to themselves and of retaining during their mechanical separation from the liquid to which they are suitably applied, some constituent or group of constituents of the liquid.

The adsorbents which have heretofore been commercially used are quite varied in their appearance, origin and value; but may be readily divided into two broad classes; the earths or clays, of natural and mineral origin, and the chars, of artificial and organic origin. In the first class fall the fuller's earths, which owe their value to the fineness of the ultimate particle, together with the acid-treated clays in which an artificial porosity has been produced in the ultimate particle and the surface exposure thereby increased. These earths or clays, which are known commercially as English fuller's earth, Florida fuller's earth or Florida clay, and California fuller's earth or California clay, are all essentially hydrous silicates or aluminum or, mineralogically, true clays, and it may be said that almost all clays have an appreciable adsorptive power, and that the particular clays named above owe their commercial value entirely to the fineness of the ultimate particle, by which they are given an adsorptive power superior to that of the great mass of clays. In these materials the aluminum silicate is the essential constituent, and while many other mineral elements such as lime, magnesia, iron and manganese are found in them, these minerals are incidental and usually detrimental constituents. Bauxite (impure aluminum oxides, limonite (an iron oxide) and bog iron ore (a mixture of limonite with peat) have also been used as adsorbents, but with doubtful results.

In the second class fall the chars formed by carbonizing various vegetable or animal substances out of contact with the air.

The clays are, as a rule, not very strong adsorbents, and owe their value mainly to their relative cheapness. They can seldom be used at all in aqueous solutions, (and then only after a partial calcination) because of their tendency to form a slimy and impenetrable mud on contact with water, and are therefore used mainly on the oils proper, that is, on animal and vegetable fats and the petroleum products. The chars, on the other hand, when properly prepared are usually extremely efficacious adsorbents, but their use is limited by their high cost. They do not form mud when brought into contact with water, and are particularly adapted to purifying sugars and other aqueous solutions. The acid treated clays have intermediate properties, that is, they mud with water, are relatively powerful adsorbents, and are about as expensive as the better class of chars, from which they are distinguished by having a relatively higher purifying power for petroleum products and a relatively lower power for fat oils and aqueous solutions.

Adsorbents are applied to the liquids to be purified in three well known ways, each of which may be the most suitable in the case of the application of some particular adsorbent to some particular liquid. The method known as "percolation" consists in reducing the adsorbent to a granular consistency and screening it into some definite range of sizes, so that it shall be free from material either coarser or finer than the limits of this range. The granular material is then formed into a mass or pack in a container having openings at top and bottom and a permeable screen or cloth on which the pack rests, and the liquid forced through the pack, either upwards or downwards, by gravity or by pressure applied to the liquid. This method, which is falling into disuse, has been common practice in the petroleum industry for purifying or "filtering" lubricating oils.

The method which has lately become known as "contacting," but which was in use for many years before this name became known, consists in grinding the adsorbent to a fine powder which usually has a limit of coarseness but no limit as to fineness, mixing this powder with the liquid to be purified, maintaining this powder in suspension in the liquid while heating to a temperature which depends on the nature of the liquid and of the adsorbent, and finally separating the powder with its adsorbed impurities from the purified liquid by some mechanical means, usually a filter press. This method has been accepted practice for a long time in the application of English fuller's earth and bone coal to fat oils and sugar solutions.

A method which has been dubbed the "mudded clay process" consists in mixing the finely pulverized adsorbent with water to the consistency of a mud or paste, mixing this paste with the liquid to be purified, and thereafter heating until the water has been driven out of the adsorbent and the latter allowed to diffuse throughout the oil. The final step in this treatment is as in the above, to filter out or otherwise remove the spent or saturated adsorbent from the purified liquid. Obviously this process cannot be applied to aqueous liquids, nor can adsorbents be used which on drying out in the manner stated form lumps, balls or grains instead of diffusing in the oil, and the process has heretofore been restricted to the application of acid-treated clays of the Montmorillonite type to petroleum lubricating oils.

We have discovered that a certain naturally occurring substance, long known but not heretofore recognized as a commercially valuable adsorbent, is, when properly prepared and suitably applied, a cheap, efficacious and generally useful purifying agent, capable of application to almost if not all the uses to which any adsorbent may be put, and having the desirable properties of both the clays and the chars. This substance is magnesium silicate, having the analysis, when in a pure condition, approximately as follows:—

Silica ($SiO_2$) 60% to 65%, magnesia (MgO) 27% to 32%, water, combined 4% to 12%.

There are numerous silicates of magnesium belonging to the group mineralogically classified as the serpentine and talc division. We cannot definitely determine to which, if to any one of the members of this group, the particular magnesium silicate to which we here refer belongs. The particular silicate which we use has the following physical properties, to wit:—The color ranges from snow white through pinkish and grayish shades to chocolate brown, but this color appears to have no connection with the value of the material as an adsorbent, and it is probable that the same materials in other colors may exist in nature. The white material, which appears to be a definite mineral, has the analysis given above, which analysis corresponds to the formula, $$H_4Mg_2Si_3O_{10}$$

or $$2H_2O \cdot 2MgO \cdot 3SiO_2.$$

This is the formula for the mineral sepiolite or meerschaum, which corresponds closely in physical properties with the material which we use. This white and pure material is of a soft and somewhat chalky texture, extremely open, light and porous, so much so that it floats freely on water when dry; is readily crushed and reduced to a fine powder, and may be rubbed to a powder between the fingers; shrinks sharply and cracks into small pieces on drying; and when placed in water or even agitated with water does not form a mud or slime. If the sample when placed in water is wet or damp it will be entirely unaffected by submersion and will retain its original form. If the sample be dry it will on submersion crack down to flakes or fragments, sometimes as small as very coarse sand, but these fragments when rubbed between the fingers are angular and firm and will not rub down to a mud unless enough pressure be applied to crush or grind them. These fragments do not swell nor gelatinize on standing in water, and if agitated with water will subside rapidly leaving the water clear. This resistance to the action of water is highly typical of the material which we use, and this property perseveres so strongly that even the admixture of considerable proportions, up to as much as forty per cent, of hydrous aluminum silicates (clays) does not cause it to break down or form a mud when mixed with water.

Occurring in streaks in the white material and in layers in connection therewith are found less pure magnesium silicates having a darker color and a denser structure. These silicates are in the main more or less contaminated with a very fine clay, and these varieties of the crude mineral are much heavier than the pure white variety, and are also considerably harder when dry, so much so that the dry lumps cannot be broken with the fingers, and that a smooth surface may be polished to a waxy lustre. These varieties of the material in some cases have an analysis resembling that of the mineral saponite, which is itself considered to be a mixture, and might possibly be classed as this mineral. There is also a variety of the mineral which without containing clay has the relatively dense texture and the waxy lustre of the valuable grades of meerschaum. The analysis of this material, when not contaminated with clay, corresponds also to the analysis of the massive variety of talc known as steatite, but we have not yet observed any specimen of steatite which has the adsorbent value possessed by the material which we use.

The distinction between all the varieties of this material, whether or not such variety be contaminated by clay or other mineral, and the minerals known as serpentine and the ordinary varieties of talc, lies in the fact that the material which we use has a strongly developed power for adsorbing color from mineral and fatty oils and from aqueous solutions of organic bodies when the mineral is ground to a fine powder and intermixed with the liquid to be decolorized under the conditions hereinafter set forth in this specification. The distinction between the material which we use and the clays which have heretofore been used for this purpose of decolorizing and purifying liquids, lies in part in the peculiar chemical composition of our material, which consists essentially of magnesium silicate, whereas the clays heretofore used consists essentially of aluminum silicate and contain magnesia only as an incidental constituent or as an impurity; and the further distinction that whereas all the clays are softened and ultimately reduced to a mudded condition by immersion in water, the magnesium silicate which we use cannot be reduced to a mud by immersion in water, but only by forcible crushing of the wetted lumps, carried to the extent that the material is reduced by crushing or grinding to a fine powder suspended in water. This distinction is a very important one inasmuch as whereas the clays which have heretofore been used for the purification of liquids are on the application of water converted into a slimy and impermeable mass which is filtered only with difficulty, the material which we use, on suspension in water, even after very fine grinding, maintains its granular consistency and may be freely filtered and thus separated from the water in which it is suspended.

Beside contamination with clay, the naturally occurring mineral often contains carbonates and oxids of magnesium and calcium, sometimes a silicate of calcium, and also various water soluble salts, mainly sulfates and chlorides, which have entered the deposit by infiltration. Some of these incidental constituents or impurities are readily removed; some of them, such as the oxids of the alkaline earths, are often beneficial for some uses; and the clay with which the magnesium silicate is often contaminated appears to act only as an inert diluent of the active magnesium silicate, and is not harmful unless present in too great quantity. It has been determined that the characteristic properties of this particular magnesium silicate, to wit: its commercial value as an adsorbent material and its ability to maintain its original physical structure when mixed with water, are not lost until the proportion of impurities (not including free water) exceed forty per cent of the weight of the material as found.

When we refer hereinafter to magnesium silicate, it will be understood that we refer to a mineral having strongly developed adsorbent properties, resistant to the action of water, consisting basically of that particular magnesium silicate having the analysis above given, and containing not to exceed forty per cent by weight of other minerals, not including free water. The mineral thus described, when pure, is probably the mineral sepiolite, though it may possibly be a form of the mineral talc or steatite, and when impure may be the mineral saponite or a mixture of minerals not known to us. The material which we claim is not any particular pure mineral, but is a natural occurring body having the properties above set forth.

In preparing the natural magnesium silicate for use as an adsorbent regard must be had to the method by which it is to be applied to the liquid, and to the nature of the liquid to which it is to be applied and of the impurities contained therein.

If the material is to be used by the percolation method, it should first be carefully dried in such a manner as not to reduce its efficiency by overheating. This mineral is readily damaged and its adsorbent power reduced by the application of too high a heat during drying, and it is preferable to dry it in the sun, climate permitting, or in a hot air drier, or in a rotary drier of the indirect-fired type. The contact with flue gases or with highly heated plates during drying is objectionable. This careful drying is required equally in all the methods of preparation described below, and as such will not be repeated. It should also be noted in each case that drying should not be carried too far—a free water content of 5% by weight is usually as low as can be tolerated without damage to the adsorbent properties of the material, and in many cases as much as 15% of free water is permissible, or as much water as will admit of ready grinding.

The material for percolation should then be crushed or ground to the point where most of it will pass through a 1/8" screen, and the material then segregated as to size on suitable shaking or tapping screens, the usual mesh ranges required being 16 to 30 mesh, 30 to 60 mesh and 60 to 90 mesh. As the material is rather soft the harder portions should be chosen for this purpose, and crushing is preferable to grinding. The portions not passing the 16 mesh screen are recrushed, while the portions passing the 90 mesh screen should be ground to the fine powder required for the contacting method. Where the demand for coarse and fine material runs in the proper proportions, it is desirable to break up the original material in a grinder of the centrifugal distintegrator type, setting the air suction so high that a very coarse grind is produced, to screen out the various coarse meshes and the contacting fines, and to regrind only that portion screening between 90 mesh and 200 mesh.

If the material is to be used in the contacting method, it should, after the careful drying above described, be ground to a fine mesh. The exact degree of fineness depends to some extent on the nature of the liquid to be purified, and is to some extent a matter of opinion about which users do not agree. In a general way this material should be a little coarser than would be desirable in the case of a clay, because of its open and porous texture; however, a grind which will entirely pass a 150 mesh is probably the coarser limit, and for some purposes a 95% through 200 mesh is desirable, while at the same time the production of any large proportion of impalpable powder, finer than 300 mesh, should be avoided as far as possible.

If the material is to be used in the "mudded clay" process it requires to be acid treated to the extent which will entirely neutralize its alkalinity. As the alkalinity of different samples will vary the exact amount of acid to be used cannot be stated, but it should be at least slightly in excess of the titration figure, and a still larger acid dose, up to 10% or 15% by weight will usually be found advantageous. The crude material, without drying, is reduced to a coarse powder and mixed with the diluted acid, the strength of the solution being from 5% to 10% when the water included in the crude material is figured in. The mixture of magnesium silicate and dilute acid is then allowed to stand; in the cold if time is no object, or at a temperature of 150° to 220° Fahr. if it is desired to hasten the reaction; until the free sulfuric acid has gone into combination. The mixture is then diluted with water and washed repeatedly until the wash water no longer shows a strong reaction for sulfates with barium chloride, after which it is drained so far as possible and ground to a paste in an edge mill or in a wet pan. If preferred, the crude material may be dried sufficiently to enable it to be ground to a fine powder and then given the above acid treatment. This makes the treatment and washing rather slower, but does away with the necessity for the final grinding. In either case the finished pulp should be a mud which, when stirred, has the consistency of thick cream, in which consistency it is most suited for application to the hot oil. If on drying out a sample of this cream by mixing with oil and heating until the water is driven off and frothing ceases, it should be found that the mineral has not diffused evenly through the oil in the form of fine black flakes, but has separated in hard granules or lumps, it is an indication that an insufficient amount of acid has been used in the treatment. If desired, hydrochloric acid may be substituted for sulfuric acid in the above treatment, though the latter is cheaper and usually more effective.

For the purification of gasoline, kerosene and similar volatile distillates, whether these be in their raw condition or have been given a light acid treatment preliminary to adsorption, material should be selected which is entirely free from alkali, or if such material is not available, then an alkaline material should be rendered slightly acid; by wet grinding to a pulp and adding a sufficient quantity of dilute sulfuric acid; or by sprinkling the powdered material with acid and then redrying and regrinding. Unless a large quantity of acid is required to neutralize the crude magnesium silicate there is no need to wash out the reaction product, as a slight acidity in the adsorbent is not objectionable in the treatment of gasoline. The material, either crude or neutralized as the case may be, is ground to at least 95% through 200 mesh and mixed with the cold petroleum spirit, agitated and thoroughly mixed for a short time, and then settled or preferably filtered out. In ordinary purification of gasoline a dose of silicate equal to from one-fourth to one-half pound per gallon of petroleum is sufficient, and from fifteen minutes to one-half hour's agitation will be enough. For kerosene and other light distillates the dose will be larger and quite variable, and to be determined only after trial. After sufficient time has been allowed for the adsorbent to expend itself it is withdrawn from the petroleum, either by subsidence and decantation or, what is far preferable, by the use of a filter press.

In purifying lubricating oils a wide variety of conditions are encountered, and each has its appropriate treatment of the magnesium silicate and method of application to the oil. Thus we have light pale oils which require only a slight purification, and heavy dark oils which are highly impure; also we have crude distillates, such as are produced by vacuum stills, oils which have been acid treated but not neutralized, and oils which have been acid treated, neutralized and water washed.

Crude vacuum distillates are usually of a pale color and require little purification. The use of an acidulated material should be avoided, as it is likely to render the product unstable, and it is preferable to select a silicate which is free from alkalinity, or if such is not available, to neutralize an alkaline silicate and carefully wash out the reaction products. In either case the material should be ground to about 85% through 200 mesh, mixed with the oil, heated to 250 to 350° Fahr. for about one-half hour, or until the crude odor of the oil has disappeared, and then filtered out in a filter press.

Relatively light lubricants which have been acid treated but not neutralized will not tolerate a silicate which reacts with acid, as the use of such will produce soap or organic salts in the purified oil, and cause it to have a poor emulsion test. The silicate for such use should either be free from alkali or should be neutralized. If only a small amount of acid is required and the silicate is left exactly neutral the reaction products need not be washed out, but if the silicate is strongly alkaline in its crude state, and thus requires a large dose of acid, or if the neutralization is not exact, the reaction products should be washed out. In either case the silicate should be dried, ground to say 85% through 200 mesh, mixed with the oil, heated to a temperature ranging between 300 and 400° Fahr., maintained at that temperature until no further bleaching effect is observed, and thereafter filtered out in a filter press.

Heavy lubricants and particularly cylinder oils or bright stocks, which have been acid treated but not neutralized, require larger does of silicate to effect sufficient purification, and it is sometimes desirable to use a silicate which has been rather heavily acid treated, up to say 25% by weight of sulfuric acid, in the manner above described. The reaction products should be washed out, but not completely, as washing to absolute neutrality will reduce the purifying power of the silicate. Usually four or five water washes, if each is carefully and completely separated, will be sufficient. The mud thus formed may be applied to the oil by the "mudded clay" process above described, or it may be freed from water, carefully dried, pulverized to about 85% through a 200 mesh, mixed with the oil, heated and filtered out. Whether used as a mud or in the form of a dry powder, the temperature should be carried to a relatively high point, not less than 400° and sometimes to 600° in the case of a heavy residual bright stock.

Where the acid treated oil has been neutralized and water washed a reasonable degree of alkalinity in the silicate is not objectionable, while even the slightest acidity is highly undesirable. For this use it is desirable to select a rather light and open grade of silicate and, after careful drying, grind it to about 90% through 200 mesh, mix with the oil, heat to a temperature of 300° Fahr. or higher (in the judgment of the operator) and filter out the spent adsorbent. The highest efficiency for this use will be attained by leaving not less than 5% nor more than 15% of water in the ground silicate.

In the purification of crude fatty oils or fats, or of such as have been previously treated with caustic alkalis, alkalinity in the silicate is not objectionable, and with some oils (particularly soya bean oil) a high degree of alkalinity is to be preferred. On the other hand the slightest acidity is not to be tolerated, and the use of acidulated or treated silicate, even if water washed, should be avoided. The silicate should be dried to from 5% to 15% of water, depending on the kind of oil to be purified, ground to 90% through 200 mesh, mixed with the oil, heated to a temperature of 150 to 200° Fahr. (or to the temperature preferred by the operator skilled in using English earth), and filtered out in a filter press. As the oils to be purified are usually costly it is desirable to select a relatively dense and heavy grade of silicate, as thus the entrainment of oil in the filter cake is reduced. Magnesium silicate, properly selected and prepared, will do usually from two to three times the work of the same weight of the best English fuller's earth, is not impaired in its action by the presence of a reasonable amount of foots or rancidity and thus may be applied to the decolorization of fat oils without a previous alkali treatment, and does not impart to edible oils the earthy taste incident to the use of Florida clay.

For the purification of fatty acids, alkalinity in the silicate is undesirable, as it will react with a proportionate quantity of fatty acid and reduce the defacating value of the silicate. For this reason either a material free from alkali should be chosen, or the material should be neutralized and washed clean. In either case it should be ground to about 90% through 200 mesh and applied in the same manner as to the fatty oils.

For the purification of resins or of gums the silicate should not contain an excessive amount of alkali, though a slight amount is not objectionable. It should be ground to about 90% through 200 mesh, and applied to rosin or other soft resins in the manner above described, but at a temperature far above the melting point of the resin to secure complete fluidity, and thereafter filtered out at the same temperature. In the case of varnish gums the silicate should be dried down to 2% to 3% water and is preferably applied to the gum after fusion and while in solution. The mixture should be heated to the highest temperature consistent with the nature of the solvent, under a reflux condenser, cooled, and filtered in the usual manner.

For the purification of sugar and similar aqueous solutions the silicate, as free from alkali as possible, is dried down to the highest water percentage at which it may be powdered, and is then ground to a relatively coarse mesh, such as will pass completely through a 100 mesh screen, added to the solution either cold or hot as may be convenient, mixed thoroughly and filtered out in the usual manner. In the purification of sugar solutions magnesium silicate may be used to replace both the inert materials heretofore used as filter aids (such as diatomaceous earth) which have for their object the removal of the mucilage and insoluble foreign matter, and the char which has heretofore has been used for decolorization. Clays cannot be used in this manner, as they slime with water and therefore (and particularly in the presence of mucilaginous substances) form an impenetrable glaze on the filter cloth, while silicate is not mudded when suspended in water and therefore forms a suitable and satisfactory filter aid while at the same time its defacating and decolorizing properties enable it to do work heretofore accomplished by the char. By the use of silicate two steps in the process are reduced to one, with a saving in cost both of material and of operation.

For the purification and bleaching of benzol and other coal tar products and so-called intermediates, it is desirable to use an alkaline silicate if the raw material contains residual traces of phenols, while if the raw material has been completely purified from phenols either an alkaline or a neutral or neutralized silicate may be used. The silicate is ground and applied in the same manner as above described for the purification of gasoline, but usually much larger doses will be required, varying of course with the degree of purification to be effected. Silicate may be used to replace part or all of any acid treatment which the crude coal tar product may require, but will not replace treatment of coal tar napthas for the separation of phenols (except in small proportions) nor will it effect any valuable fractionation of the various homologues of which such napthas are composed.

Magnesium silicate occurs in nature in masses, which in such form are not adapted for use as adsorbents. These masses are, for use, reduced to a granular or pulverulent condition, as has above been fully set forth. When, in the claims which follow, we refer to the "finely divided condition" we refer to the subdivision of the mass into such grain, mesh or degree of fineness as will render the material suitable for use in the manner and for the purpose already set forth in this specification. It will also be understood that where the magnesium silicate is prepared by treating it with acid, the subdivision into a finely divided condition may take place before the treatment, or after the treatment, or after the treatment and the ensuing washing with water, or partly before and partly after such treatment.

We claim:—

1. An agent for the purification of liquids by adsorption, consisting of magnesium silicate which has been treated with sulfuric acid and reduced to a finely divided condition.

2. An agent for the purification of liquids by adsorption, consisting of magnesium silicate which has been treated with sulfuric acid, washed with water and reduced to a finely divided condition.

3. An adsorbent for the purification of liquids, consisting of magnesium silicate which has been treated with sulfuric acid dried to not exceeding twenty-five percent by weight of water and reduced to a finely divided condition.

4. An adsorbent for the purification of of liquids, consisting of magnesium silicate which has been treated with sulfuric acid, washed with water, dried to not exceeding twenty-five percent by weight of water and reduced to a finely divided condition.

5. An agent for the purification of liquids by adsorption, consisting of natural magnesium silicate which has been treated with an acid for the neutralization of the alkalinity of the silicate without destroying the silicate and reduced to a finely divided condition.

6. An agent for the purification of liquids by adsorption, consisting of natural magnesium silicate to which has been added a sufficient quantity of a mineral acid to produce a slight acid reaction without materially attacking the aluminum and magnesium silicate and the mixture thereafter reduced to a finely divided condition.

7. An agent for the purification of liquids by adsorption, consisting of natural magnesium silicate which has been treated with sulphuric acid to neutralize the alkalinity of the silicate, and thereafter reduced to a finely divided condition.

8. An agent for the purification of liquids by adsorption, consisting of natural magnesium silicate which has been treated with a sufficient quantity of an acid to neutralize the alkalinity without dissolving the silicate, and which has been thereafter washed with water and reduced to a finely divided condition.

9. An agent for the purification of liquids by adsorption, consisting of natural magnesium silicate which has been treated with a mineral acid to produce an acid reaction without destroying the silicate, the reaction products washed out with water, and the silicate reduced to a finely divided condition.

In testimony whereof we have signed our names to this specification.

PAUL W. PRUTZMAN.
ARNOLD D. BENNISON.